United States Patent Office 3,167,366
Patented Jan. 26, 1965

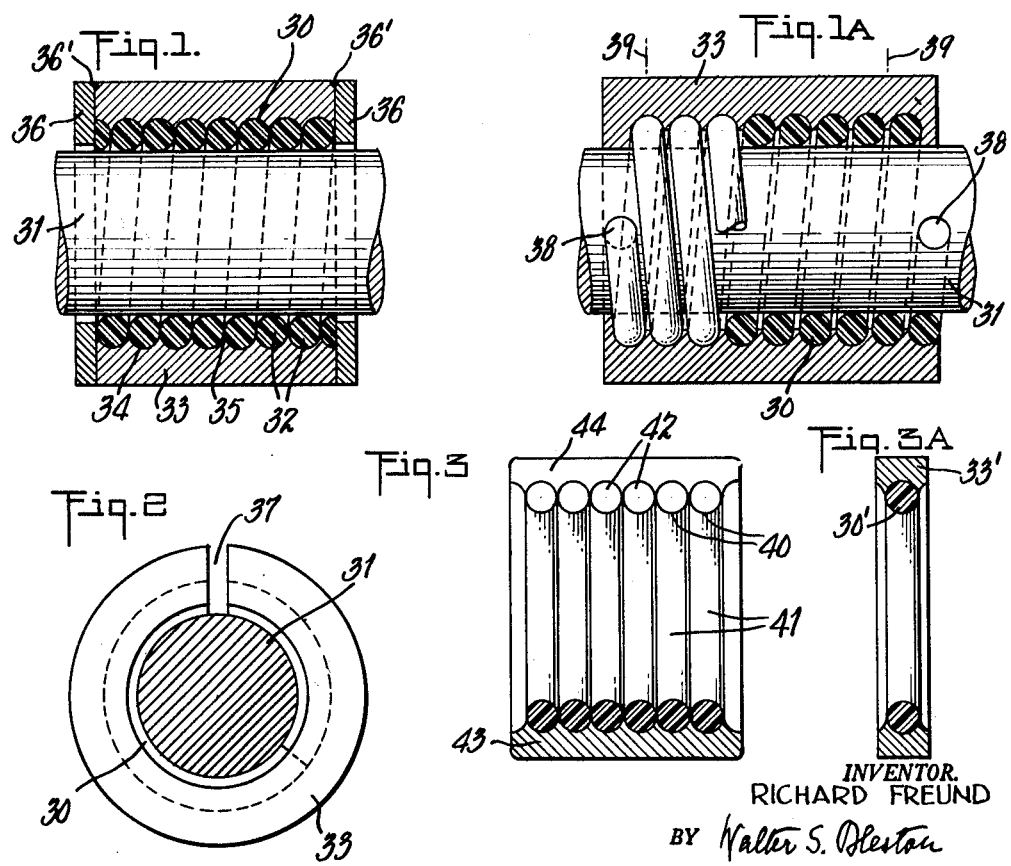

3,167,366
RESINOUS FACED BEARING
Richard Freund, 273 Lawton Ave., Cliffside Park, N.J.
Filed Mar. 7, 1961, Ser. No. 93,918
14 Claims. (Cl. 308—238)

The invention relates to resinous faced bearings of the sleeve type as well as of other types. Whereas bearings incorporating plastics such as fluorocarbons, fluorated hydrocarbons and hydrocarbon resins have many desirable features, difficulties are frequently encountered with such bearings not only due to plastic deformation or cold flow but especially due to the poor heat conductivity of such plastic or resinous material. Excessive heat accumulation readily occurs and where a high coefficient of friction exists high speeds and heavy loads creating more heat will easily be the cause of a breakdown of the bearing.

The invention aims, therefore, to provide a bearing designed to incorporate the advantages of plastics or resinous materials and to eliminate at least some of the main factors which limit the usefulness of plastic bearings.

The invention also aims to provide a bearing which can be easily and inexpensively produced even where close tolerances are required and in which friction will be reduced and heat dissipated, even when high loads or speeds are applied.

The poor thermal characteristics of plastics call for a thin plastic bearing skin to reduce the thermal expansion and the insulation against heat flow out of a bearing and to improve the coefficient of friction and reduce the heat generated in bearings.

The material of the plastic rings may be selected from the synthetic resins, such as fluorocarbons, fluorated hydrocarbons, and hydrocarbon resins.

Of the plastics presently on the market for bearing purposes polytetrafluoroethylene is a most desirable one. Its coefficient of friction when dry decreases as the load increases to a certain point, and if the plastic is thin enough and the load sufficiently high, the coefficient can be as low as that of lubricated nylon. Hard backing of a very thin plastic surface ensures a very low friction, it being essential that the plastic be restrained from any deformation when subjected to varying pressure.

In one form of bearings embodying the invention, there is employed polytetrafluoroethylene material in the form of fibers, i.e. in the form of threads or strings. The reason is that such threads or strings as available on the market and made of very thin fibers, have a very high tensile strength and a very low coefficient of friction. A metal is preferably used to take up the heat generated in the fibrous plastic. In forming the bearing surface of a polytetrafluoroethylene thread, however, it is necessary to take account of this plastic's property of a "memory" which makes permanent deformation and easy handling, e.g. in coil form, extremely difficult, whereas other plastics readily take and maintain any desired new form.

A practical way of forming a bearing of a fibrous polytetrafluoroethylene material according to my invention consists in the coiling of a thread or string of that material on a mandrel with the convolutions side by side or slightly spaced and then applying a metal backing which also enters at least partly in the interstices between adjacent convolution surfaces. This metal constitutes a one-piece sheath. It can be applied in various ways and not only provides a thermal path from the bearing surface to the outer diameter but also holds the plastic thread in the desired coil form and renders it possible to handle the plastic coil.

As in certain installations the plastic helical coil would tend to turn with the shaft and screw to the one side, it is another object of my invention to slit or cut a slot like a keyway axially through the metal and plastic and then to deform the sheath axially so that each turn of the plastic is in one plane and that instead of the helix there is a series of separate rings or turns. The metal backing will then hold the plastic turns in their planes even when the turns are subjected to an axial pressure. Any required number of turns may be cut out of the slotted and deformed structure. Thus, a bearing may comprise a plurality of turns or even only a single turn to form a jewel bearing of small diameter and width.

It is also possible, as it will be described hereinafter, so to construct the bearing that it is useful as an air bearing by supplying air under pressure at one end or inside of the bearing so as to feed air across each plastic land. In such an event, the plastic surface will be capable of bearing the shaft in an emergency should the air supply fail.

Further objects and details of the invention will be apparent from the description given hereinafter and the accompanying drawing illustrating several embodiments thereof by way of example. In the drawing:

FIG. 1 is a cross-section of a bearing with a fibrous plastic material in the form of a coiled thread or string.

FIG. 1a is a similar cross-section illustrating the manner in which the bearing of FIG. 1 may be produced.

FIG. 2 is a front view of the same bearing slotted for being deformed,

FIG. 3 is a cross-section of a deformed bearing with a plurality of plastic turns, FIG. 3a is a cross-section of a one turn bearing.

Figure 4:
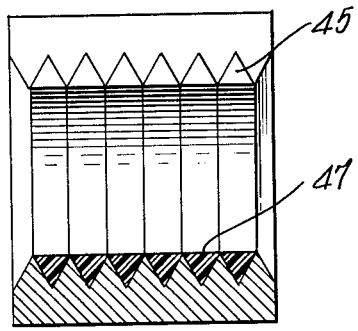
FIGS. 4 and 5 are cross-sections of bearings with threads or strings of different cross-sections respectively.

Polytetrafluoroethylene in fiber form in the useful range has a tensile strength of only a little less than 50,000 p.s.i. with a friction coefficient when dry, i.e. not lubricated, of between .01 and .04. The compression strength is commonly substantially higher than the tensile strength and loads of more than 60,000 p.s.i. have been withstood without appreciable creep. However, the poor thermal characteristics of the material call for a thin plastic skin to reduce thermal expansion, to reduce insulation against the heat flow out of a bearing with a fibrous carrying surface, and to reduce the heat generated in the bearing. Now according to one form of my invention and under consideration of the properties of the fibrous material stated hereinabove, I provide a bearing having a surface formed of a helically coiled thread or string spun of fibers of polytetrafluoroethylene wherein the fibers may have a thickness of perhaps .00005" and the thread or string may have a diameter of about .015". However, I wish it to be understood that my invention is not limited to any specific dimensions of the bearing surface thread or string, but that the used material may have any desired thickness provided the required properties are obtained. It has been stated that the coiled thread which forms the bearing surface should be backed and as far as possible covered also sideways by a heat-conducting metal.

A bearing of this kind is illustrated in FIG. 1 where a length of a thread 30 of polytetrafluoroethylene fibers is helically wound on a mandrel 31. The dimensions of the parts of this figure as in all the figures of the drawing are not conforming to their sizes in actual bearings according to my invention but are selected merely in order clearly to show the structure. The thread 30 is coiled with the several convolutions 32 closely side by side. The convolutions of the formed coil are embedded in a metal backing 33 which intimately contacts the plastic thread at its outer periphery 34 and on the sides of the convolutions at 35 as far as almost to the line of contact of the adjacent turns. This backing, on the one hand, receives and readily dissipates the heat generated on the inner peripheral surface of the coil which constitutes a bearing surface for a rotating shaft and, on the other hand, keeps the thread in the coil form against the restraint of the material's "memory" which may tend to unroll the thread. In order to hold the ends of the coil in their proper places washers 36 may be soldered to the end faces of the bearing as indicated at 36'. It will be noted that these washers have an inner diameter slightly larger than the diameter of the mandrel.

Of the great variety of metals useful for the purpose, even one of the poorest heat conductors may be selected as its conductivity may be any way in the neighborhood of 100 times that of the plastic. The metal backing can be applied in various ways depending on the properties of the particular material. The backing need not be thicker than necessary to contain the plastic during its final assembly in a bearing sleeve or the like. For example, zinc and aluminum or a tin-lead alloy could be die cast around the plastic coil in a die; nickel and copper might be deposited on the plastic by chemical alloy plating as developed e.g. by the "Kanigen" process; or a solder metal may be applied to the plastic-threads; all these metals and many more could be added as a sprayed metal coat after the plastic coil has been prepared to take it as it is well known in the art. The polytetrafluoroethylene fibers stand a high degree of thermal shock so that temperatures of say 1000° F. of the metal particles during the application would not damage the bearing surface. Since no bond between the metal envelope or backing and the plastic coil is intended, mechanical roughness of the seat may aid in locating the convolutions and minimize their tendency to turn.

It will be understood that my invention is not limited to any particular process of producing the plastic coil and applying the backing but that any suitable method may be used for that purpose. A preferred method is illustrated in FIG. 1a where the mandrel 31 is provided with two bores 38 spaced from each other a distance larger than the length of the bearing such as shown in FIG. 1. The plastic thread is first secured in one of the holes 38 and then helically wound on the mandrel towards the other hole where the other end of the coil will be secured. Thereupon the backing e.g. a solder may be applied over the whole length of the coil. Then the bearing will be trimmed to its proper size by sawing at 39, 39 through the backing and the coil. The bearing may finally be stripped from the mandrel and the washers 36 may be applied. The finished bearing i.e. the combined plastic and metal structure may be inserted directly in a bearing structure or in a sleeve to be installed in a bearing body.

The bearing shown in FIG. 1 can be improved by providing it with a radial slot and, then, subjecting it to an axial pressure so that the slotted convolutions of the plastic thread are brought each into a radial plane. In FIG. 2 the bearing of FIG. 1 is provided with a radial slot 37 in an axial plane cut through both the plastic coil 30 and the metal backing 33. This slotting may take place when the mandrel 31 has been withdrawn. However, I prefer to apply both steps of operation, i.e. the slotting and the mentioned subjecting to axial pressure while the mandrel is still within the bearing in order to ensure that the finished bearing turns out with the desired diameter and roundness. When finally the mandrel will have been withdrawn or the bearing stripped off the mandrel, the bearing will have the shape shown in FIG. 3. The bearing surface 40 is now formed of a plurality of individual plastic turns 41 which are slotted at 42 and thus are no more connected to but in close contact with one another. The metal backing has changed under the slotting and compressing operations from the form 33 (FIG. 1) into the form 43 (FIG. 3). Its slot appears at 44 and it will be noted that the backing 43 is continuous throughout the bearing whereas, as stated hereinbefore, the plastic thread is in the form of separate slotted rings 41. The advantages of such slit bearing consist essentially in that the gap in the plastic permits considerable expansion thereof with rising temperatures without seriously affecting the diameter of the bearing surface, and that the gap also permits a close contact of the metal backing with a surrounding sleeve or bore for a better heat flow into the latter similar to the pressure contact of a piston ring in a cylinder. On the other hand, the gap may be closed partially or completely when desired by a press fit of the metal backing or sheath into a surrounding sleeve. This may become important in an air bearing, i.e. in a bearing where air is pressed through between a shaft and its surrounding structure. A bearing with any required number of turns may be so formed, or it may be cut out of the slotted and deformed structure. Thus e.g. FIG. 3 shows a bearing with six turns, whereas FIG. 3a illustrates a one turn jewel bearing with a plastic ring 30' and sheath portion 33'.

Figure 5:
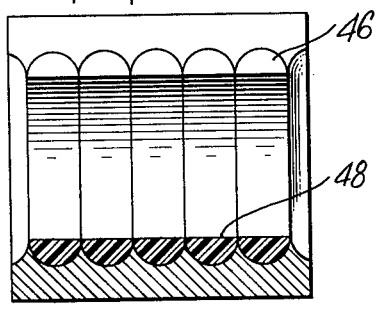
Figure 5A:
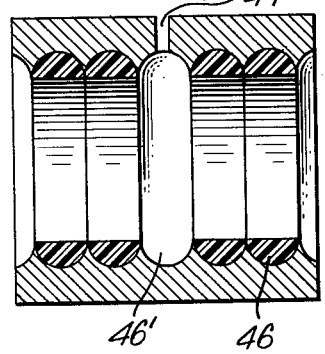
FIG. 5a is a cross-section of a modified FIG. 5 bearing.

In that type of bearing just described, the cross-section of the polytetrafluoroethylene thread or string may differ from the round cross-section of the FIGS. 1 and 3. In fact, a triangular cross-section as at 45 in FIG. 4 or a D-shaped cross-section as at 46 in FIG. 5 is advantageous inasmuch as the metal backing can reach much closer to the bearing surface than with the round thread of FIGS. 1 and 3. Furthermore, in FIGS. 4 and 5 the bearing surfaces 47 and 48 respectively, form continuous cylinders, i.e. maximum bearing surfaces whereas in FIGS. 1 and 3 the bearing surfaces are formed by a helical line and a plurality of circular lines, respectively. The bearings of FIGS. 3 to 5 are also well suited for being used as air bearings, in which event, as stated hereinbefore the gap should be closed, and one or several individual plastic turns may be removed to provide an annular passage for better distribution of the air. Such a bearing is shown in FIG. 5a where an air entrance is provided at 49 and one of the plastic turns is removed at 46'.

It will be apparent to those skilled in the art that many alterations and modifications of the structures shown and described hereinbefore can be made without departure from the essence and spirit of my invention which for that reason shall not be limited but by the scope of the appended claims.

I claim:

1. A bearing for a shaft comprising a plurality of coaxial, circular turns of a very thin fibrous, plastic material; and a metal sleeve provided with as many inner circumferential grooves as there are turns, said turns being embedded in said grooves, respectively, with their outermost portions and on their sides at least throughout a substantial portion of the turn cross-section.

2. A bearing as in claim 1 wherein said turns and said sleeve are slitted in an axial plane.

3. A bearing as in claim 1, the cross-section of said turns being substantially circular.

4. A bearing as in claim 1, the cross-section of said turns being triangular, one side of the triangular cross-section of each turn forming a continuous inner cylindrical surface.

5. A bearing as in claim 1, the cross-section of said turns being semi-circular, the plane sides of the cross-section of each turn forming a continuous inner cylindrical face.

6. A bearing for a shaft comprising a plurality of coaxial, circular turns of a very thin fibrous, plastic material, said turns being arranged in two sets of substantially equal numbers of turns, said sets being spaced from each other substantially the width of one turn, the turns in each set contacting each other and forming a continuous inner cylindrical surface; and a metal sleeve provided with one inner circumferential groove more than there are turns, said turns being fittingly embedded in said grooves, respectively, with their outermost portions and at least a substantial portion of the sides of each turn cross-section, the central one of said grooves being empty and connected by a duct through said sleeve to the outside.

7. A shaft bearing comprising:
   (a) a rigid bearing backing member including one or more surface grooves;
   (b) and one or more turns of filamentary plastic material individually positioned in said grooves in a single layer;
   (c) a portion of the cross-section of each of said turns corresponding essentially to that of said grooves;
   (d) and the exposed peripheries of said turns lying precisely in a desired surface and constituting the sole bearing support.

8. A shaft bearing comprising:
   (a) a metallic bearing backing member including one or more surface grooves;
   (b) and one or more turns of filamentary plastic material individually positioned in said grooves in a single layer;
   (c) a portion of the cross-section of each of said turns corresponding essentially to that of said grooves and in good thermal contact therewith;
   (d) and the exposed peripheries of said turns lying precisely in a desired surface and constituting the sole bearing support.

9. A shaft bearing comprising:
   (a) an annular rigid sleeve including one or more internal peripheral grooves;
   (b) and one or more turns of filamentary plastic material individually positioned in said grooves in a single layer;
   (c) a portion of the cross-section of each of said turns corresponding essentially to that of said grooves;
   (d) and the inner peripheries of said turns lying precisely in a cylindrical surface and constituting the sole bearing support.

10. A shaft bearing comprising:
    (a) an annular metallic sleeve including one or more internal peripheral grooves;
    (b) and one or more turns of filamentary plastic material individually positioned in said grooves in a single layer;
    (c) a portion of the cross-section of each of said turns corresponding essentially to that of said grooves and in good thermal contact therewith;
    (d) and the inner peripheries of said turns lying precisely in a cylindrical surface and constituting the sole bearing support.

11. A shaft bearing comprising:
    (a) an annular rigid sleeve including one or more internal peripheral grooves;
    (b) and one or more turns of filamentary polytetrafluoroethylene individually positioned in said grooves in a single layer;
    (c) a portion of the cross-section of each of said turns corresponding essentially to that of said grooves;
    (d) and the inner peripheries of said turns lying precisely in a cylindrical surface and constituting the sole bearing support.

12. A shaft bearing comprising:
    (a) an annular rigid sleeve including one or more internal peripheral grooves;
    (b) and one or more turns of filamentary plastic material having a dry coefficient of friction with steel of the order of 0.01 to 0.04, said turns being individually positioned in said grooves in a single layer;
    (c) a portion of the cross-section of each of said turns corresponding essentially to that of said grooves;
    (d) and the inner peripheries of said turns lying precisely in a cylindrical surface and constituting the sole bearing support.

13. A shaft bearing comprising:
    (a) an annular rigid sleeve including a continuous helical internal peripheral groove;
    (b) and a helix of filamentary plastic material positioned in said groove;
    (c) a portion of the cross-section of each of the turns of said helix corresponding essentially to that of said groove;
    (d) and the inner peripheries of said turns lying precisely in a cylindrical surface and constituting the sole bearing support.

14. A shaft bearing comprising:
    (a) an annular rigid sleeve including a continuous helical internal peripheral groove;
    (b) and a helix of filamentary plastic material positioned in said groove;
    (c) a portion of the cross-section of each of the turns of said helix corresponding essentially to that of said groove;
    (d) the inner peripheries of said turns lying precisely in a cylindrical surface and constituting the sole bearing support;
    (e) and said bearing being slit axially.

References Cited in the file of this patent

UNITED STATES PATENTS

| | | |
|---|---|---|
| 2,227,969 | Haushalter | Jan. 7, 1941 |
| 2,732,613 | Renholts | Jan. 31, 1956 |
| 2,768,034 | Skinner | Oct. 23, 1956 |
| 2,815,253 | Spriggs | Dec. 5, 1957 |
| 2,953,418 | Runton | Sept. 20, 1960 |
| 2,989,355 | Terhorst | June 20, 1961 |

FOREIGN PATENTS

| | | |
|---|---|---|
| 913,547 | France | Sept. 12, 1946 |